United States Patent [19]
Chadha

[11] Patent Number: 5,963,908
[45] Date of Patent: Oct. 5, 1999

[54] SECURE LOGON TO NOTEBOOK OR DESKTOP COMPUTERS

[75] Inventor: Tejpal Chadha, San Jose, Calif.

[73] Assignee: Intel Corporation, Santa Clara, Calif.

[21] Appl. No.: 08/771,491

[22] Filed: Dec. 23, 1996

[51] Int. Cl.[6] .................................................. G10L 5/06
[52] U.S. Cl. ............................................................ 704/273
[58] Field of Search .................................... 704/236, 273, 704/272, 270, 275, 231, 246, 250, 200; 379/88

[56] References Cited

U.S. PATENT DOCUMENTS

| | | | |
|---|---|---|---|
| 5,216,720 | 6/1993 | Naik et al. | 704/272 |
| 5,402,492 | 3/1995 | Goodman et al. | 380/25 |
| 5,430,827 | 7/1995 | Rissanen | 704/272 |
| 5,499,288 | 3/1996 | Hunt et al. | 379/88 |
| 5,623,539 | 4/1997 | Bassenyemukasa et al. | 704/273 |

*Primary Examiner*—Richemond Dorvil
*Attorney, Agent, or Firm*—Blakely, Sokoloff, Taylor & Zafman LLP

[57] ABSTRACT

A system and method for controlling user access to stored content and interconnections to various sites accessible through a publicly accessible network. In one embodiment, the system includes a computer having a microphone to receive analog voice audio. The voice audio is filtered and digitized to produce a digital voice pattern. The digital voice pattern is compared to a master digital voice pattern. If successful, the amount of access afforded to a requesting user is determined based on the priority level of master digital voice pattern.

15 Claims, 4 Drawing Sheets

SECURE LOGON TO NOTEBOOK OR DESKTOP COMPUTERS

BACKGROUND OF THE INVENTION

1. Field of the Invention

The present invention relates to the field of data security. More particularly, the present invention relates to a system including biometric circuitry which, upon verification that voice audio is from an authorized user, permits access stored contents within the computer and various sites on a publicly accessible network.

2. Description of Art Related to the Invention

Currently, there have been many security mechanisms that can be used to protect data stored within a laptop or desktop computer. For example, one widely-used security mechanism involves an alphanumeric, password-based program normally stored on a hard disk drive of the computer. This program may be part of the Operating System ("OS"). Upon being executed after power-up of the computer, the password-based program causes a message to be displayed on a display screen of the computer. This message prompts the user to input a correct alphanumeric password before data access is granted. The password is normally input into the computer by depressing selected keys of its keyboard.

Over the last few years, several disadvantages associated with the use of alphanumeric, password-based programs have been realized. One disadvantage is that this type of security mechanism can be easily circumvented through repeated attempts to uncover the correct password. This circumvention can be facilitated through the assistance of a random sequence generation program continuously generating various alphanumeric combinations. Another disadvantage is that alphanumeric password-based systems become less effective because passwords tend to be used for long periods of time, and thus, are learned by others through normal course of business or family life.

In addition to protecting stored content (e.g., data) of the computer, there is a growing need for persons, namely parents, to preclude minors from gaining access to various web sites accessible by Internet Service Providers (e.g., AMERICA ON-LINE™) to which they believe are not suitable for viewing by their child. In fact, there are additional needs to protect their child from accessing various "chat lines" to prevent possibly unwanted persons from communicating with their child. Currently, there are current versions of Browser programs (e.g., Netscape 3.0™ provided by Netscape Communications Corporation of Mountain View, Calif., and IE™ from Microsoft Corporation of Redmond, Wash.) which require password logon. Likewise, there exist additional utilities, such as Net Nanny™ having a web page at "www.NetNanny.com," which allows parents to restrict the use of Internet to certain sites by forcing minors/children to enter their password when going to a site that is not authorized for under 18 years of age. However, there is no mechanism to offer such protection alone or in combination with protecting stored content of the computer through a secure, biometric mechanism.

Therefore, it would be advantageous to develop a system that includes biometric circuitry that analyzes a voice pattern of the user to verify whether the user has access to stored content of the computer, and in addition, to regulate access to various web sites on a publicly accessible network based on the priority assigned to the user.

SUMMARY OF THE INVENTION

The present invention relates to a system and method for controlling user access to stored content and interconnections to various sites accessible through a publicly accessible network. In one embodiment, this method may include the following operational steps. First, a voice audio spoken by a requesting user to received in an analog form by the system. The system transforms the analog voice audio into a digital voice pattern for use in comparison with one or more master digital voice patterns. After a successful comparison is performed, a determination is made as to whether a priority level, assigned to the master digital voice pattern, is lesser in priority than a predetermined priority level. If so, the requesting user's access to various sites accessible through a publicly accessible network is partially or completely restricted as well as possibly access to various stored contents. Otherwise, the requesting user has unlimited access to stored content and sites accessible through the publicly accessible network.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention relates to an electronic system and method for internally performing biometric operations to verify (authenticate or identify) an individual before allowing him or her access to stored content within the electronic system as well as access to various sites on a publicly accessible network including, but not limited to one or more Wide Area Network(s). In the following description, some terminology is used herein to discuss certain well-known functionality. For example, an "electronic system" is a personal computer (e.g., a laptop or desktop computer), or other electronic hardware capable of processing data such as a facsimile machine, printer and the like. "Voice audio" is sound in an analog format produced by a person talking. A "digital voice pattern" is defined as voice audio digitized into a predetermined number of bits used during calculations in authenticating or identifying whether the voice audio originating from an authorized user. A "site" is a unique location along a publicly accessible network such as the Internet.

In the present invention, access to stored contents of the electronic system and certain sites may be controlled by implementing biometric-related circuitry within the electronic system in order to conduct voice recognition in accordance with well-known verification techniques such as user authentication or user identification. Under a user authentication technique, voice audio from the requesting user is captured and subsequently compared with a pre-stored master digital voice pattern assigned to the requesting user. Under a user identification technique, however, there is no previous identification by the person seeking access to the electronic system; instead, digital voice pattern(s) until a successful comparison is detected or all of the pre-stored master digital voice pattern(s) have been checked without a successful comparison being detected. This reliance on voice pattern attributes of the user for verification purposes mitigates the likelihood of an unauthorized user gaining access to stored contents of the electronic system. However, other types of biometric access control systems (e.g., fingerprint or retinal scanners) may be utilized; however, they may be costly to implement on typical desktops and/or notebooks.

Figure 1:
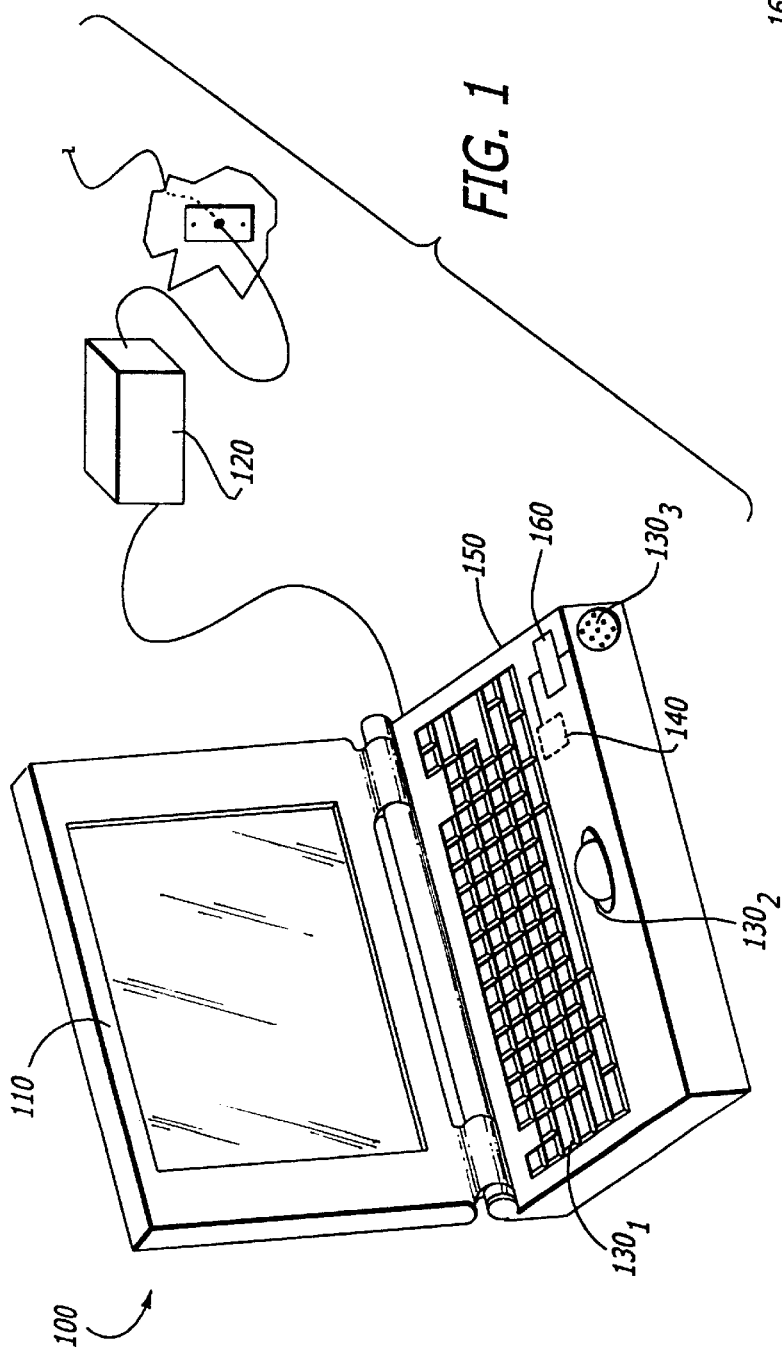
FIG. 1 is an illustrative block diagram of a personal computer includes biometric circuitry that regulates access to a computer.

Referring to FIG. 1, an illustrative embodiment of an electronic system 100 implemented with biometric circuitry to control access to stored content of the electronic system, or access to certain sites of a publicly accessible network (e.g., web site on the Internet) through an interconnection program (e.g., a Browser program) is shown. For illustrative purposes, however, the electronic system 100 is portrayed as a laptop personal computer ("PC").

As shown, the electronic system 100 comprises a display monitor 110 and a transceiver device 120 (e.g., a modem, fax/modem card, Network Interface Circuit ("NIC") Card, etc.) which may be implemented within a casing 150 of the electronic system 100 (not shown) or external to the casing 150 as shown. The electronic system 100 further comprises a plurality of input devices $130_1$–$130_n$ ("n" being a positive whole number, n>1). These input devices $130_1$–$130_n$ include an alphanumeric keyboard $130_1$, cursor control device $130_2$ (e.g., a mouse, touch pad, trackball, joystick, Thinkpad™, etc.) and a microphone $130_3$. It is contemplated that other input devices may be used such as a numeric keypad, a credit card reading device and the like.

In this embodiment, a biometric device 140 is enclosed within the casing 150 of the electronic system 100 and is electrically interconnected to receive information captured by a voice capture circuit 160. It is contemplated that the biometric device 140 may include, but is not limited to a host processor of the electronic system 100 executing voice comparison software or a separate application specific integrated circuit ("ASIC") performing the voice comparison independent of the host processor, or any other device capable of processing data (e.g., a controller, state machine, and the like). It is further contemplated that the biometric device 140 may be positioned within an input device (not shown) physically outside the casing 150.

Figure 2:
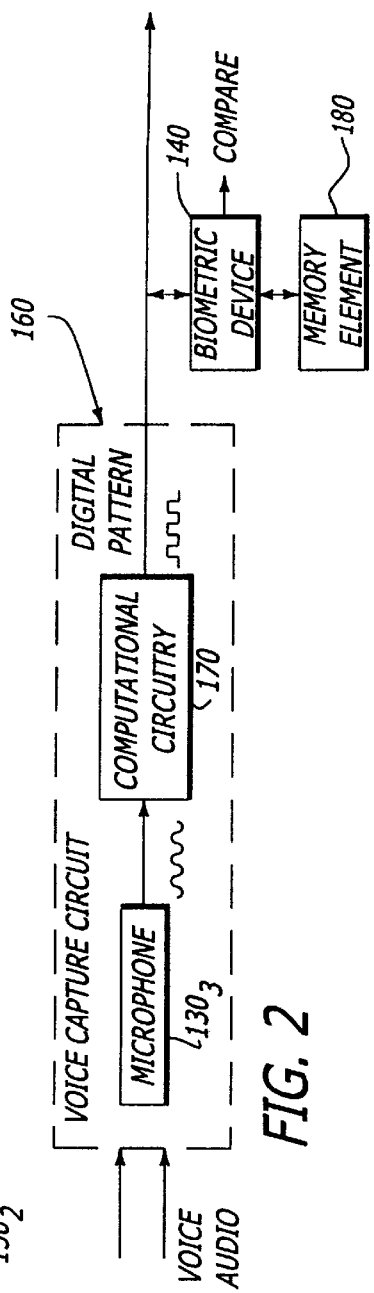
FIG. 2 is a block diagram of an embodiment of the voice capture circuit used to capture voice audio to produce a digital voice pattern for comparison with one or more master digital voice patterns.

As shown in FIG. 2, the voice capture circuit 160 includes the microphone $130_3$ and computational circuitry 170. As a result, the voice capture circuit 160 captures voice audio. More specifically, the microphone $130_3$ obtains analog audio signals (e.g., voice audio) and the computational circuitry 170 appropriately filters the analog audio signals through the use of, for example, a Fast Fourier Transform ("FFT") to obtain unique portions of voice audio. This filtering may be performed by hardware wired to perform the FFT function, or more likely, hardware executing a FFT program. This hardware may include, but is not solely limited to an application specific integrated circuit (ASIC). The computational circuitry 170 further includes analog-to-digital ("A/D") conversion circuitry (e.g., an A/D converter or logic gates collectively performing A/D conversion) which transforms the unique, filtered portions of voice audio into a digital voice pattern. Thereafter, the digital voice pattern is input into the biometric device 140.

The biometric device 140 compares the digital voice pattern with one or more master digital voice patterns contained within a memory element 180 connected to the biometric device 140. The memory element 180 may include non-volatile memory (e.g., Random Access Memory "RAM", Erasable Programmable Read-Only Memory "EPROM", Electrically Erasable Programmable Read-Only Memory "EEPROM", etc.) whose contents can be easily updated.

Figure 3A:
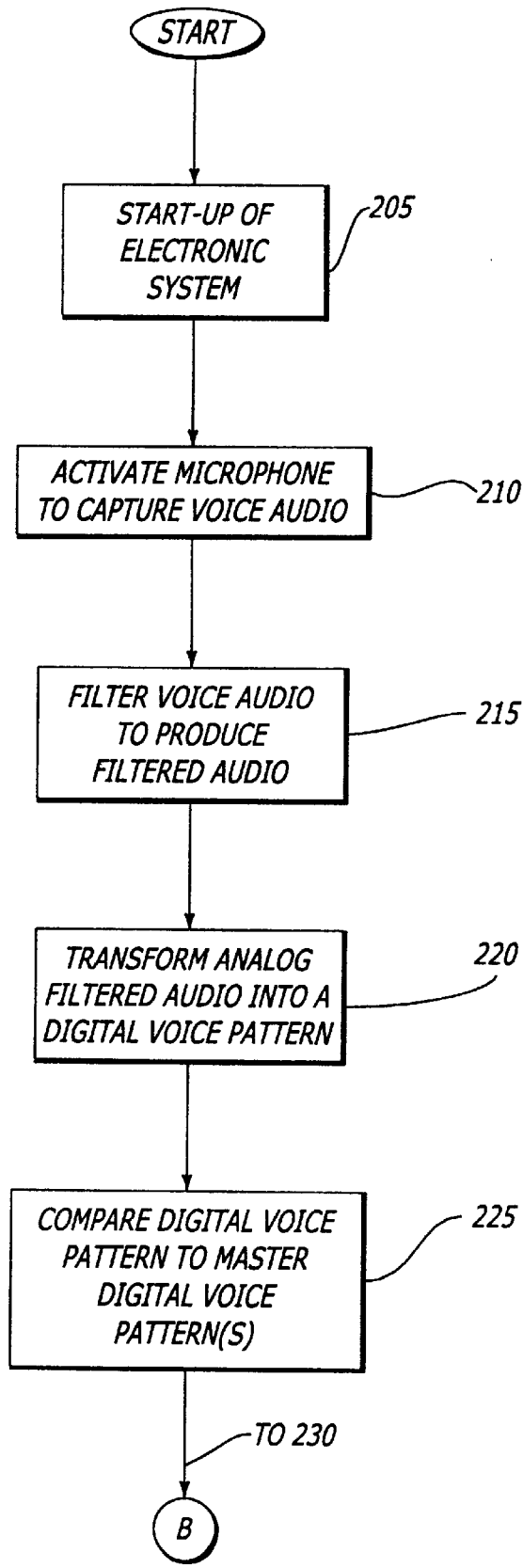
FIGS. 3A and 3B is an illustrative flowcharts of the operations of the electronic system of FIG. 1 in order to control access to stored content within that electronic system as well as various web sites.
Figure 3B:
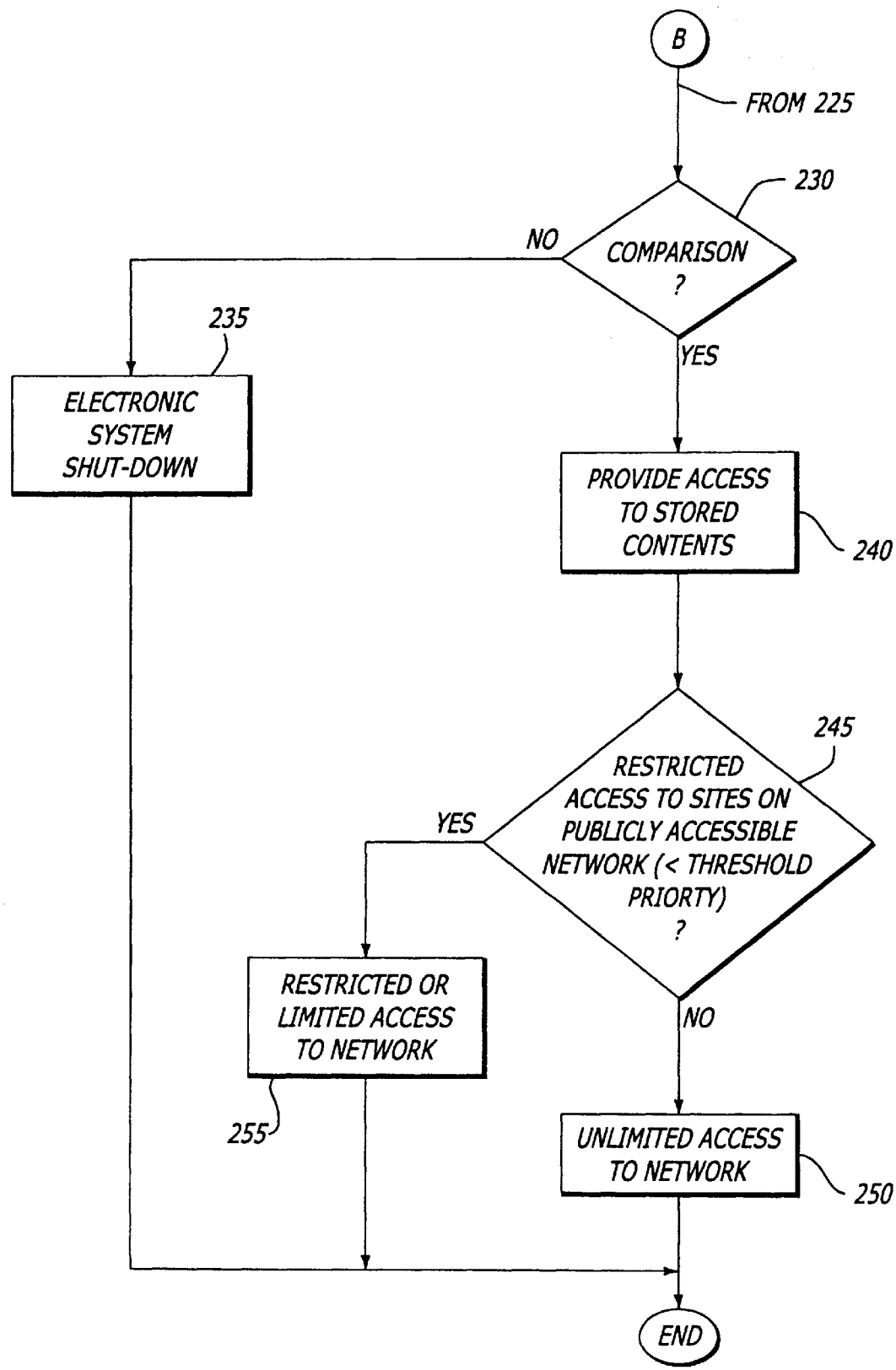

Referring now to FIGS. 3A and 3B, the operational steps performed by the electronic system to authenticate or identify a requesting user of the electronic system is shown. In Step 205, typically after start-up of the electronic system based on one or more actions by the requesting user (e.g., depressing a key, flipping a switch or touching a selected portion of a "touch screen"), the electronic system may be configured to activate the microphone to capture audio for a predetermined period of time (Step 210). Optionally, a prompt message may be displayed on the display monitor requesting the user to speak into the microphone of the PC (not shown). Upon capturing voice audio for the predetermined period of time, the microphone routes the voice audio to computational circuitry that initially filters the voice audio to eliminate noise and focus on unique frequencies of the voice audio through use of FFT, and that transforms the filtered audio into a digital voice pattern (Steps 215–220). Thereafter, the digital voice pattern is compared with one or more master digital voice pattern(s), depending on whether a user authentication or user identification technique is employed (Step 225). If no comparison is detected, the electronic system may be shut-down by any conventional manner such as, for example, disabling (i) the host processor contained in the electronic system, (ii) biometric device or (iii) circuitry controlling power distribution within the electronic system (Steps 230 and 235).

Otherwise, upon successful comparison, the requesting user is provided access to the electronic system (Step 240). However, the access may be restricted based on the priority of the master digital voice pattern matching the digital voice pattern (Step 245). If the master digital voice pattern has a priority level greater than a threshold priority, when executing a Browser program, the requesting user will be given unlimited access to all web sites located on the Internet (Step 250). However, if the master digital voice pattern has a priority level less than the threshold level, when executing the Browser program, the requesting user may be precluded from interconnecting with various web sites or even limited access to connect to only certain authorized web sites (Step 255). It is contemplated that preclusion may be easily adapted to current versions of Browser programs as now performed by Netscape Communications Corporation and Microsoft Corporation. It is further contemplated that the master digital voice pattern may be assigned a priority level based on its address location within the non-volatile memory and that a staggered scale of multiple priority levels may be used so that older children may be give more access to the Internet than younger children.

Figure 4:
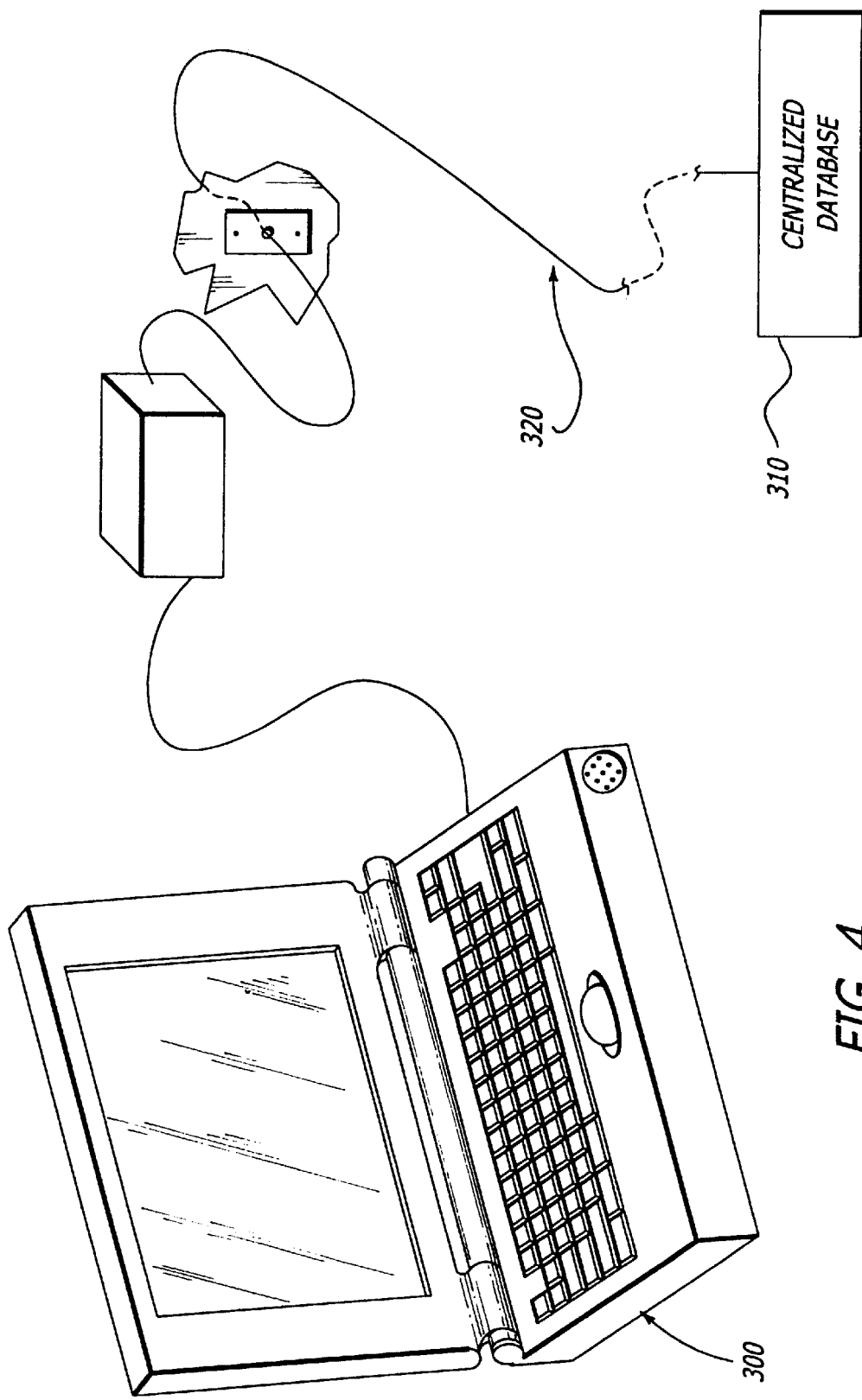
FIG. 4 is an illustrative perspective view of another embodiment of the present invention.

Referring to FIG. 4, another embodiment of the electronic system is shown in which the user identification technique is utilized. The operations of the two types of electronic systems are similar. However, the electronic system 300 is interconnected to a centralized database 310 to download a number of master digital voice patterns into memory (not shown) for temporary buffering storage or storage for a longer duration. It is contemplated that a communication line 320 between the electronic system 300 and the centralized database 310 is secure through cryptographic schemes such as symmetric key cryptography or public/private key cryptography.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains, are deemed to lie within the spirit and scope of the invention.

What is claimed is:

1. An electronic system comprising:

a microphone to receive audio in an analog format;

computational circuitry coupled to the microphone, the computational circuitry to filter the audio to produce a filtered audio, the filtered audio subsequently being used to produce a digital voice pattern; and a biometric device coupled to the computational circuitry, the biometric device including circuitry to receive the digital voice pattern as an input, to compare the digital voice pattern with a master digital voice pattern, and if matching, to provide limited access to a publicly accessible network by allowing access to a predetermined group of web sites when the master digital voice pattern has a priority level equal to or greater than a predetermined priority level and by excluding access to the predetermined group of web sites when master digital voice pattern has a priority level lower than the predetermined priority level.

2. The electronic system according to claim 1, wherein the computational circuitry includes filtering hardware to perform a Fast Fourier Transformation on the audio to produce the filtered audio.

3. The electronic system according to claim 2, wherein the computational circuitry further includes an analog-to-digital converter to transform the filtered audio into the digital voice pattern.

4. The electronic system according to claim 1 further comprising a memory element coupled to the biometric device, the memory element to contain at least the master digital voice pattern.

5. The electronic system according to claim 1, wherein the biometric device includes an application specific integrated circuit.

6. An electronic system comprising:

a microphone to receive audio in an analog format;

computational circuitry coupled to the microphone, the computational circuitry to filter the audio to produce a filtered audio, the filtered audio subsequently being used to produce a digital voice pattern; and a biometric device coupled to the computational circuitry, the biometric device to limit access to a publicly accessible network by preventing access to at least one web site associated with the publicly accessible network when a master digital voice pattern either differs from the digital voice pattern or has a priority level and allows full access to the publicly accessible network when the priority level of the master digital voice pattern is at least equal to the predetermined priority level.

7. The electronic system according to claim 6, wherein the computational circuitry includes filtering hardware, the filtering hardware being used to perform a Fast Fourier Transformation on the audio to produce the filtered audio.

8. The electronic system according to claim 7, wherein the computational circuitry further includes analog-to-digital conversion circuitry to transform the filtered audio into the digital voice pattern.

9. The electronic system according to claim 7 further comprising a memory element coupled to the biometric device, the memory element being used to contain at least the master digital voice pattern.

10. The electronic system according to claim 6, wherein the biometric device includes a host processor.

11. An electronic system comprising:

audio input means for receiving audio;

compute means for filtering the audio to produce a filtered audio subsequently being digitized to produce a digital voice pattern, the compute means being coupled to the audio input means;

biometric means for receiving a master digital voice pattern and the digital voice pattern as inputs, for performing a comparison between the digital voice pattern and the master digital voice pattern, for analyzing a priority level assigned to the master digital voice pattern, and for limiting access to a publicly accessible network by precluding access to at least one web site while still allowing access to the publicly accessible network when the digital voice pattern is not substantially identical to the master digital voice pattern, the biometric means being coupled to the compute means.

12. The electronic system according to claim 11, wherein the biometric means further for precluding access to the at least one web site when the priority level is less than a predetermined threshold level.

13. The electronic system according to claim 12, wherein the compute means includes filtering hardware being used to perform a Fast Fourier Transformation on the audio to produce the filtered audio.

14. A method for regulating access by an electronic system to a plurality of web sites accessible through a publicly accessible network, comprising:

comparing a digital voice pattern with a master digital voice pattern;

determining a priority level assigned to the master digital voice pattern when a successful comparison is performed; and limiting access to a publicly accessible network by precluding the requesting user from accessing at least one web site of the plurality of web sites accessible through publicly accessible network when the priority level is less than a priority threshold level while still allowing access to the remaining web sites.

15. The method of claim 14 further comprising:

capturing a voice audio associated with a requesting user; and transforming the voice audio in an analog format into a digital voice pattern.

* * * * *